United States Patent [19]

Willinger

[11] Patent Number: 4,714,547

[45] Date of Patent: Dec. 22, 1987

[54] AQUARIUM TUBULES

[75] Inventor: Allan H. Willinger, Oakland, N.J.

[73] Assignee: Willinger Bros., Inc., Oakland, N.J.

[21] Appl. No.: 859,448

[22] Filed: May 5, 1986

[51] Int. Cl.⁴ .............................................. A01K 63/04
[52] U.S. Cl. .................................... 210/169; 210/282; 210/290; 210/484
[58] Field of Search ............... 210/169, 273, 315, 282, 210/317, 290, 318, 416.2, 500.1, 150, 151, 618, 452, 484; 55/361, 381

[56] References Cited

U.S. PATENT DOCUMENTS

| | | | |
|---|---|---|---|
| 3,357,563 | 12/1967 | Sicard | 210/315 |
| 3,882,027 | 5/1975 | Lunt | 210/500.1 |
| 3,968,034 | 7/1976 | Tymoszczuk | 210/618 |
| 4,005,010 | 1/1977 | Lunt | 210/282 |
| 4,312,752 | 1/1982 | Malik | 210/169 |
| 4,401,447 | 8/1983 | Huber | 210/484 |
| 4,483,769 | 11/1984 | Sherman | 210/484 |

OTHER PUBLICATIONS

Billmeyer, *Text Book of Polymer Science*, 2nd Edition, John Wiley & Sons, Inc., 1962, pp. 499 & 500.

*Primary Examiner*—Peter Hruskoci
*Assistant Examiner*—Coreen Y. Lee
*Attorney, Agent, or Firm*—Helfgott & Karas

[57] ABSTRACT

An aquarium water treatment module comprising a tubule formed of biologically acceptable thermoplastic material. The tubule has a specific gravity proximate that of water. The tubule can be inserted within a filter device such as an internal aquarium filter or a filter cartridge. The tubule is light in weight so that it can disperse within the filter. The tubule supports the propagation of organisms useful in the biological filtration of the water.

13 Claims, 6 Drawing Figures

AQUARIUM TUBULES

BACKGROUND OF THE INVENTION

This invention relates to aquarium filtration, and more particularly to a tubular section for promoting effective filtration of aquarium water.

A key aspect of aquarium maintenance is the proper water treatment to ensure a healthy environment to the aquarium animal life. Waste material from the aquatic animals, in conjunction with unconsumed food particles and decay from decomposed dead fish, all tend to accumulate within the aquarium tank and produce toxic materials harmful to the aquarium inhabitants. Various filtering techniques are utilized to remove or transform this toxic waste material. Mechanical filters are usually associated with the aquarium to physically trap the waste particles. These filters can be external or internal type filters.

In addition to mechanical filtration, chemical filtration which uses activated carbon, is frequently utilized to neutralize some of the toxic effect of the waste material. One of the most effective means of filtration, however, is biological filtration which utilizes the presence of aerobic bacteria to convert ammonia contained within the toxic waste into harmless nitrates. The bacteria propagate on all surfaces of the aquarium. Their presence is increased by the provision of an adequate supply for oxygen within the water and sufficient surface area for propagation and growth. The bacteria propagate by intake of the waste material which is then converted into harmless substances.

Within filter systems, there is generally provided a filtering chamber wherein the filtration of the water takes place. Inside the filtering chamber, there is usually provided a filter medium to treat the water and provide filtration. Typically, activated carbon or charcoal may be utilized as well as a fluffy mass of synthetic resin fibers, or floss.

It has also been known to utilize ceramic tubes within the filtering chamber. The ceramic tubes provide water tracks defining passageways through the filtering chamber. The aquarium water is thereby dispersed within the filtering chamber to utilize all of the filtering material within the chamber. The ceramic tubes provide surface area on which aerobic bacteria can grow and propagate within the filtering chamber.

Ceramic tubes have had limited functional use. Because of their ceramic composition, they are heavy and thereby add considerably to the weight of the filter making it difficult to handle and requiring extra support for the filter itself. When placed in a filter chamber, because of this weight, the ceramic tubes will settle at the bottom of the filter and will stay there despite the movement of water through the filter.

Because of the weight and bulky nature of the ceramic tubes, the filter container in which the ceramic tubes are placed, must be of sufficient dimension and sturdiness to support an isolated mass of the tubes.

An additional difficulty with the ceramic tubes is that their production costs are high. Because of this cost nature, it is difficult and costly to discard ceramic tubes and therefore the ceramic tubes are generally re-used after they become clogged. This necessitates having to clean the ceramic tubes which is difficulty, messy, and often time consuming. At times steam cleaning or boiling would be necessary.

Accordingly, while ceramic tubes have been available, they have thus far had limited use especially with external and internal type filters. The ceramic tubes have high cost, difficulty in cleaning, and limited versatility due to their weight.

SUMMARY OF THE INVENTION

The aquarium tubule of the present invention is formed of a biologically acceptable thermoplastic material. These materials are non-toxic and do not adversely effect the fish life. It is made of very thin walled cylinders and of small size. The specific gravity of the tubules proximates that of the water. As a result, depending upon the particular type of thermoplastic material utilized, they may be slightly lighter than water in which case they would float on the water, or they might be slightly heavier than water in which case they would be easily dispersed and moved within the water. Additionally, the particular desired density can be controlled by the incorporation of filler material such as talc to provide a desired specific gravity with respect to the water.

Because of the lightweight nature of the tubules, placement of the tubules within a filtering chamber does not unnecessarily incumber the weight of the filter. Furthermore, placement of the tubules in a filtering cartridge such as that described hereinafter permits the tubules to be widely dispersed throughout the cartridge and the tubules will not settle at the bottom in one location. This permits dispersion of the aquarium water throughout cartridge and not only at the bottom which would occur with ceramic tubes.

The lightweight nature of the tubules also aides in dispersing any additional filtering material such as activated carbon that may be within the filtering chamber. The presence of carbonaceous material or certain ion exchange resins in the filtering chamber would be dispersed and spread by the presence of the lightweight tubules of the present invention. The dispersed nature of these tubules within the filtering chamber provides more paths throughout the filtering chamber.

The tubules of the present invention are also resilient. As a result, they will not crack when manipulated and will not splinter apart as did the ceramic tubes. Furthermore, because the thermoplastic tubules are easy to manufacture at extremely low cost, they are disposable and need not be cleaned and re-used. When the tubules become clogged, all of the tubules can be discarded and new tubules inserted thereby eliminating messy cleanup.

Because of the lightweight nature of the tubules and their resilient characteristic, the tubules of the present invention can be advantageously utilized in filter cartridges. Filter cartridges are utilized as the filtering medium in connection with various filter systems. These cartridges typically include a pair of spaced apart walls of floss material supported on a rigid frame. Internally of the filter cartridge are placed carbonaceous particles, or the like. The water flows through the cartridge from one wall to the other passing through the interior space containing the carbonaceous material. The tubules of the present invention can be included inside the cartridge. Because of their lightweight nature, they will not sag to the bottom of the cartridge as occurred when the ceramic tubules were inserted. Furthermore, with the ceramic tubes inserted, it would tend to rupture the cartridge with the heavy weight of the tubes in conjunction with the wet soggy nature of the flossy walls of the cartridge. Also, broken pieces of the ceramic could cut or tear the walls of the cartridge.

The lightweight nature of the present tubules avoids sagging since the tubules will be generally dispersed throughout the entire interior space of the cartridge. Also, when comprised of resilient and unbreakable thermoplastic it avoids the tearing that occurred in the floss walls with the ceramic tubes. The tubules of the present invention also aid in the dispersion of the carbonaceous materials throughout the interior of the filter cartridge.

The thermoplastic tubules of the present invention are thin walled and of small size. As a result, they also provide additional mechanical filtration by trapping some of the particles as the water flows through the tubules. Additionally, because of the small nature, and their thin walls, there is provided a greater surface area of tubule material per volume as compared to the surface area per volume of ceramic tubes. This substantially increases the available area for the propagation of organisms which are active in the biological filtration of the aquarium water.

The lightweight nature of the present tubules permits a degree of tubule mobility when the tubules are loosely placed with a rigid filter. As the water flows through the filtering chamber, the tubules provide tortuous paths for the water which causes additional turbulence to the water. This tends to shake and move around the lightweight tubules within the filtering chamber. Particles that may be trapped can thereby be freed and permits the water to penetrate between the tubules thus loosening up these particles for effective filtration. It thereby prevents the packing of the material as would be the case with ceramic tubes.

The tubules themselves can be extruded as a very thin walled plastic cylinder which can then be cut into small tubules of desired length.

Accordingly, it is an object of the present invention to provide aquarium water treatment modules in the form of tubular elements made from biologically acceptable thermoplastic material.

Another object of the present invention is to provide aquarium tubules in the form of thin walled cylinders which can be placed within filtering chambers of aquarium filters.

Yet another object of the present invention is to provide aquarium tubules which have a specific gravity proximately that of the water.

Yet another object of the present invention is to provide aquarium filter members in the form of tubular sections of biologically acceptable thermoplastic material whose density can be adjusted to achieve a desired specific gravity of the module.

Still another object of the present invention is to provide an aquarium filtering cartridge including thin walled tubules of biologically acceptable thermoplastic material.

The aforementioned object, features and advantages of the invention will, in part, be pointed out with particularity, and will, in part, become obvious from the following more detailed description of the invention, taken in conjunction with the accompanying drawings, which form an integral part thereof.

BRIEF DESCRIPTION OF THE DRAWINGS

In the drawings.

In the various figures of the drawing, like reference characters designate like parts.

DESCRIPTION OF THE PREFERRED EMBODIMENT

Figure 1:
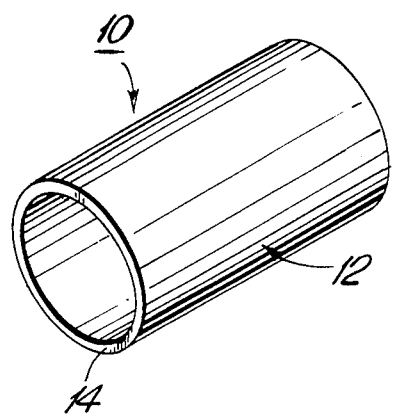
FIG. 1 is a perspective view of an aquarium water treatment module in accordance with the present invention.

Referring now to FIG. 1, there is shown an aquarium water treatment module 10, in accordance with the present invention, and provided in the form of a tubular member 12 having an external cylindrical wall 14. The tubular member can be formed of thermoplastic material such as polystyrene, polypropylene, polyethylene, or other polyolefins. It can be extruded in long lengths and cut into individual section lengths desired. Typically, the walls are exceedingly thin, being proximate of a size of 5/1000th inch to 30/1000th inch. The outside diameter of the tube can vary and can proximately be anywhere from 1/16th inch to ⅜th inch. The length may be of any desired length but typically would be of approximately ⅛th inch to ½ inch.

It should be appreciated that the particular sizes are given by way of example, and that any such size can be utilized in accordance with the features hereinafter provided. The thin walled nature, however, provides significant improvement as will hereinafter be explained.

By forming the tubules of a thermoplastic material, the specific gravity is approximately the same as that of water. In certain cases, for example, with polypropylene, the material is slightly lighter than water and therefore the tubules would float upward in the water. With other thermoplastic materials, it may tend to be slightly heavier than water and therefore may drift below the surface of the water.

Although the lightweight nature of the tubules provides improved benefits as will hereafter be described, the density can additionally be controlled and varied by adding filler material. For example, approximately 5-40% of talc or other mineral fillers or fiberglass can be added to the polypropylene in order to keep the tubules at the bottom of the aquarium or filter, should that be desired.

The use of the tubules enhances the biological filtration of the water in an aquarium filter. Placement of the tubules within the filter permits aerobic bacteria to propagate along the surface of the tubules thereby providing enhanced biological filtration as the water passes through the filter. Using the thin walled, lightweight tubules of the present invention, it is possible to achieve a greater amount of surface area within a given volume than was heretofore achievable using the ceramic tubes. As a result, there is provided a greater aerobic surface area for use in the biological filtration of the water.

The lightweight nature of the tubules also provides significant improvement in their use within the filters. Because of such lightweight nature, the tubules would tend to drift within the filtering chamber thereby providing a dispersion of the tubules throughout the chamber. In filtering cartridges, they also tend to distribute the activated carbon particles that may be present in the filtering chamber thereby providing a greater distribution of filtering material throughout the cartridge. When used with filter cartridges, the heavy ceramic tubes lag at the bottom of the cartridge providing filtration at the lower portion of the cartridge rather than distributing the filtering material throughout the chamber.

Figure 2:
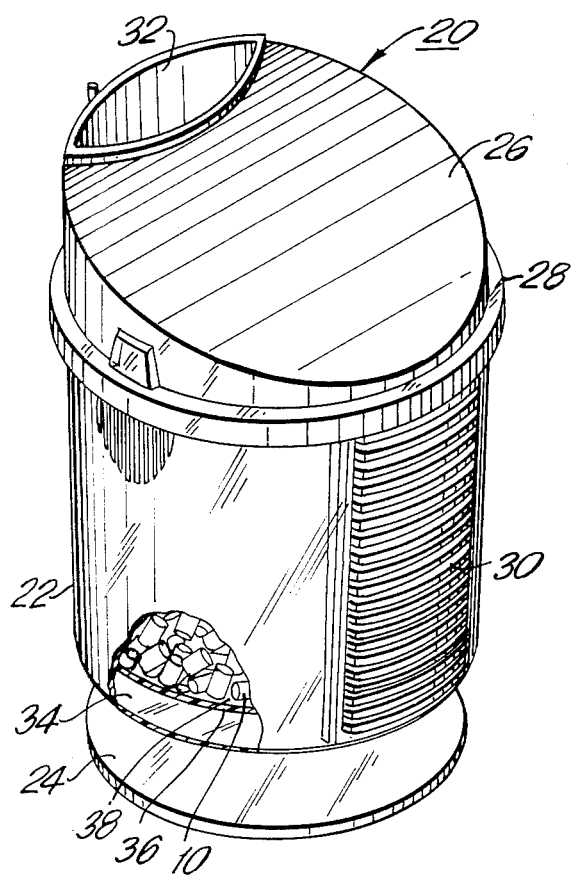
FIG. 2 is a perspective view, partially broken, of an internal bottom aquarium filter containing the tubules of the present invention within the filtering chamber.

FIG. 2 shows an internal or bottom aquarium filter 20 of a type described in copending application Ser. No. 808,094, filed 12/12/85, assigned to the assignee of the present invention. Briefly, there is provided an external cylindrical housing 22 spaced from a disk shape, stem or post. A cover 26 having a peripheral lip 28 which fits over the upper rim of the container 22 closes off the top of the container. At the front of the container, there is provided an open grill 30 through which aquarium water can enter into the chamber. An airlift chamber 32 extends downwardly from the cover 26 into the cylindrical housing 22 and terminates at a lower end in communication with a clear water compartment 34 at the bottom of the container 22. A shelf 36 is positioned within the container 22 to separate the clear water chamber therebeneath 34, from the filtering chamber 38 thereabove.

In operation, the internal filter 20 would be placed at the bottom of the aquarium tank with the gravel retainer 24 seated beneath the gravel to retain it in position. An air pipe would be extended downwardly into the tank and extend into the airlift tube 32. Air would be pumped into the pipe. As the air exits from the distal end of the air pipe, it flows upward into the air lift tube causing a suction which pulls water from the clear water chamber upward with it in the air lift tube. This suction causes an intake of aquarium water through the grill 30 thereby providing a continuous flow of the water through the aquarium filter.

Within the filtration chamber 38, there is typically placed various types of filtering material such as activated carbon, polyester floss, and the like. As shown in FIG. 2, there is also provided a dispersion of the tubules 10, of the present invention. These tubules are shown in FIG. 2 as being provided by themselves within the filtration chamber 38. They can be either placed to partially fill the chamber or can entirely fill the chamber.

Figure 3:
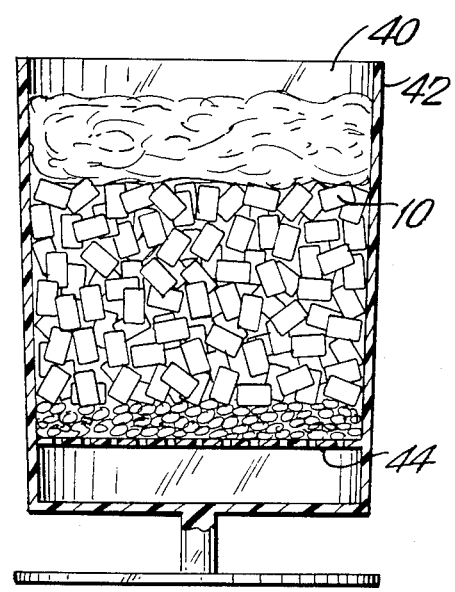
FIG. 3 is a cross sectional view taken through the filtering chamber of the aquarium of FIG. 2 and showing the layering of various filtering material within the filtering chamber.

Referring now to FIG. 3, there is shown another type of dispersion of various filtration material within the filtering chamber 40 of the internal aquarium filter 42. In this case, placed on the shelf 44 is a first layer of activated carbon. This is then overlaid with a layer of tubules of the present invention following which a layer of polyester floss would be included. While this is one typical arrangement, it should be appreciated that other arrangements could be utilized and not all of the types of filtering material shown in FIG. 3 need be included. For example the tubules could be interspersed with the carbon.

Figure 4:
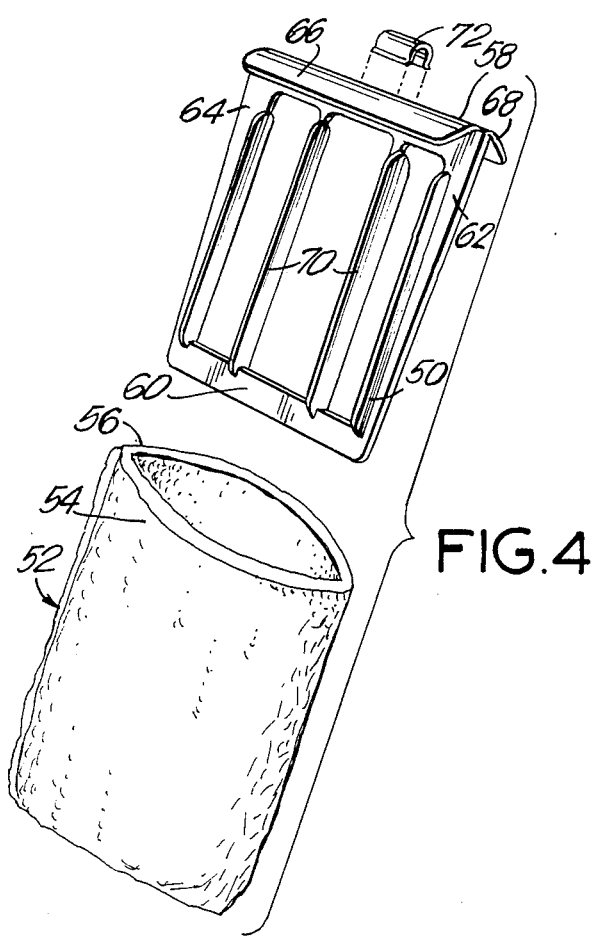
FIG. 4 is an exploded perspective view of a filter cartridge which can use the tubules of the present invention.
Figure 5:
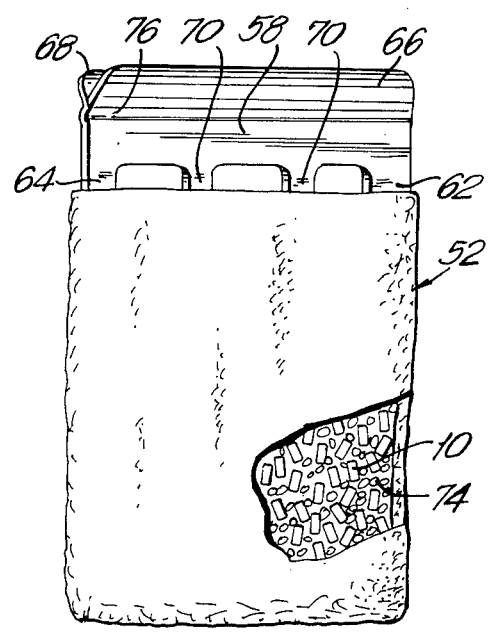
FIG. 5 is a partially assembled, broken away view of the filter cartridge shown in FIG. 4 and indicating the presence of the tubules in the internal space of the filter cartridge envelope.

In addition to utilizing the tubules in a filter housing, the tubules can also be utilized in a filter cartridge, as shown in FIGS. 4 and 5. Specifically, the filter cartridge includes a frame 50 and a filter envelope 52. The filter envelope is formed of any suitable filter material and may be constructed of synthetic resin fibers in a random or non-woven pattern. The envelope has a front wall 54 and a back wall 56 which are joined on three of the four perimeter edges of each.

The frame can be of molded plastic. It includes a perimeter defining a frame formed by top portion 58, bottom portion 60 and side portions 62 and 64.

Two flaps 66, 68 are hingedly attached to the top edge of top portion 58. In the preferred embodiment, the flaps 66, 68 are integrally molded with the frame and provided with plastic integral hinges. However, the flaps may be attached in any known manner.

Traversing the interior of the peripheral frame are a plurality of separators 70. The separators extend laterally beyond the front and back of the frame surface in the direction of the flow of the water being filtered when the cartridge is in use. The separators are shown as vertical flanges which have a narrow thickness in the direction parallel to the top portion and bottom portion 58, 60. This minimizes the surface area which is transverse to the flow of the water being filtered when the cartridge is in use. The separators 70 have a width which is narrow so as not to interfere with the flow of water.

In use, the frame is positioned within the filter envelope. Suitable filtration material is inserted into the envelope such as activated charcoal, or the like. The flaps 66, 68 are then folded down sandwiching the upper edge of the filter envelope 52. When the assembled cartridge is inserted into a filter assembly, the flaps will be normally held down. However, optionally, in order to ensure that the flaps hold the envelope tightly, a clip 72 can be used. The clip is also useful in preventing the escape of filtering material in shipping the cartridge preassembled.

As shown in FIG. 5, internally of the filter cartridge, there is placed the activated charcoal 74. However, along with the charcoal are placed tubules 10 in accordance with the present invention. The tubules can be interspersed within the charcoal and aid in the distribution of charcoal through the interior of the cartridge. The tubules will not break the charcoal as would occur with the ceramic tubes of the prior art.

The presence of the tubules not only serves in aiding the filtration by providing biological filtration, as well as in dispersing the existing charcoal. The tubules also serve to spread apart the front and back walls of the envelope to prevent them from sandwiching together. Although the existence of the separators 70 on the cartridge frame also serves this function, the tubules aid in such separation and prevent the walls of the envelope from sandwiching together.

Figure 6:
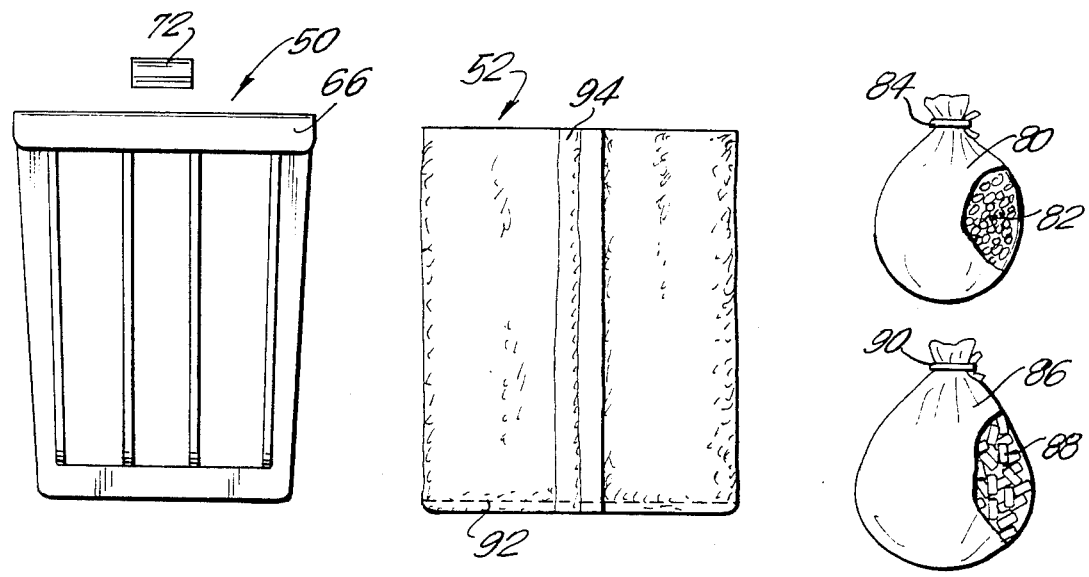
FIG. 6 is an exploded view of a filter cartridge kit utilizing the tubules of the present invention.

As shown in FIG. 6, the filter cartridge can be provided as an aquarium filter kit in a single box or package. The kit can include the frame 50 as heretofore described in FIGS. 4 and 5 in conjunction with envelope 52 as heretofore described. The kit can actually contain a single frame with multiple envelopes. The frame is reusable while the envelopes are disposable after they become clogged.

The package can also include a bag 80 of activated carbon 82. The bag can be sealed off by any closure means 84. There can also be provided a second bag 86 containing the tubules 88 of the present invention. This bag can also be closed off by any closure means 90. The clip 72 can also be provided for extra securing of the cartridge onto the envelope.

The user can thereby assembly the kit by placing the framework inside the envelope, adding a desired amount of activated carbon 82 and tubules 88 and closing the flaps 66, 68 onto the top of the envelope.

After the cartridge gets clogged, the user can remove the cartridge from the filter assembly, and dispose of the entire cartridge. He could also extract the framework from the envelope and dispose of just the envelope together with the activated carbon and tubules, both of which are disposable. The cartridge can then be cleaned, preferably in cool water so as to not disturb the aerobic bacteria that have propagated on the framework. The framework with the aerobic bacteria can now be inserted into a new envelope and additional carbon and tubules inserted into the envelope.

In FIG. 6, the envelope is shown to include the stitching 92 along the lower surface and a folded over mating edge 94 along a longitudinal portion of the envelope. The envelope can be formed of a single sheet of material folded over with the edges being joined along the longitudinal portion 94 and then the bottom closed off at 92.

The tubules can also be used in cannister filters. These filters are placed externally of the aquarium tank and used with air of water pumps. All the benefits previously described for use of the tubules with respect to the internal or bottom aquarium filter will also apply to the use of the tubules with the cannister filter.

There has been provided heretofore the best embodiment of the invention presently contemplated. However, it is to be understood that changes and modifications may be made thereto without departing from the spirit of the invention.

I claim:

1. In combination, an aquarium filter cartridge for use in aquarium filtering by placement in a flow path of a recirculating system of water from the aquarium and a plurality of tubules disposed within the cartridge, said cartridge comprising a frame member and a filter envelope, said filter envelope being formed of a filter material and having a front wall and a back wall and a closed bottom which is closed on three of the four perimeter edges, said frame being positioned within said envelope, said tubules formed of a biologically acceptable thermoplastic material, for supporting the propagation of organisms which are active in the biological filtration of aquarium water, to provide biological filtration within the filter cartridge, said tubules in conjunction with said frame member serving to retain said walls in spaced apart relationship such that aquarium water can flow into one wall, traverse said frame member, pass through the tubules and exit from the opposing wall, said tubules being disposed within the cartridge sufficiently to disperse the water traversing between the walls to provide a distribution of the water across substantially the entire opposing wall.

2. The combination as in claim 1, wherein the specific gravity of the tubules proximates that of water.

3. The combination as in claim 1, wherein the tubules are resilient.

4. The combination as in claim 1, and further comprising additional filtering material in the envelope, the tubule serving to disperse the additional filtering material.

5. The combination as in claim 4, wherein the walls of the tubules are between 5/1000th and 30/1000th of an inch.

6. The combination as the claim 1, wherein the density of the tubules approximates the density of water.

7. The combination as in claim 1, and comprising means for varying the density of the tubules to suitably adjust its specific gravity.

8. The combination as in claim 7, wherein said means for varying the density includes a filler material.

9. The combination as in claim 1, wherein the material of the tubules is selected from the group consisting of polypropylene, polystyrene, and polyethylene.

10. The combination as in claim 1, wherein said tubules comprise thin walled generally tubular sections, the walls being adopted to support propagation of organisms, which are active in the biological filtration of aquarium water.

11. An aquarium kit for aquarium filtration comprising a substantially rigid filter cartridge framework, an envelope of filter material having a front wall and a back wall and a closed bottom which is closed on three of the four perimeter edges defining an inner space therebetween and receiving therein said framework, said framework acting to separate said walls, carbonaceous material for insertion into the inner space for filtering of water passing through the cartridge, cylindrical thermoplastic tubules for insertion into the inner space for aiding in the separation of the walls, providing a distribution of water across substantially the entire surface of the walls, and aiding in the filtration and means for closing the envelope which when assembled provides a filtration system.

12. A kit as in claim 11, wherein the tubules are thin walled, resilient, and have a specific gravity proximate that of water.

13. An aquarium filter cartridqe comprisinq a substantially rigid filter cartridge framework, an envelope for filter material said envelope being formed of a filtering material and having a front wall and a back wall and a closed bottom which is closed on three of the four perimeter edges defining an inner space therebetween and receiving therein said framework, said framework acting to separate said walls, carbonaceous material in the inner space for filtering of water passing through the cartridge, cylindrical thermoplastic tubules in the inner space for aiding in the separation of the walls and providing biological filtration in said filter cartridge, and means for closing the envelope.

* * * * *